United States Patent
Koppolu et al.

[11] Patent Number: 5,365,412
[45] Date of Patent: Nov. 15, 1994

[54] LOW PROFILE ILLUMINATOR

[75] Inventors: Prasad M. Koppolu, Troy; Jeyachandrabose Chinniah, both of Troy; Amir Fallah, Holly; Mahendra Dassanayake, Troy, all of Mich.

[73] Assignee: Ford Motor Company, Dearborn, Mich.

[21] Appl. No.: 1,591

[22] Filed: Jan. 7, 1993

[51] Int. Cl.⁵ ............................................. F21V 8/00
[52] U.S. Cl. ........................................ 362/32; 362/61
[58] Field of Search .................... 362/31, 32, 61, 297, 362/298, 300, 301, 307

[56] References Cited

U.S. PATENT DOCUMENTS

| | | |
|---|---|---|
| 1,419,482 | 6/1922 | Wood . |
| 1,589,664 | 6/1926 | Ryland . |
| 1,815,751 | 7/1931 | Whalen . |
| 1,995,012 | 3/1935 | Rivier . |
| 2,198,014 | 4/1940 | Ott . |
| 2,229,693 | 1/1941 | Dietrich . |
| 3,900,727 | 8/1975 | Hutz . |
| 4,241,382 | 12/1980 | Daniel . |
| 4,389,698 | 6/1983 | Cibie . |
| 4,408,266 | 10/1983 | Sclippa . |
| 4,417,300 | 11/1982 | Bodmer . |
| 4,432,039 | 2/1984 | Cibie . |
| 4,456,948 | 6/1984 | Brun . |
| 4,494,176 | 1/1985 | Sands et al. . |
| 4,523,262 | 6/1985 | Shinkai . |
| 4,536,834 | 8/1985 | Sands et al. . |
| 4,556,928 | 12/1985 | Tysoe . |
| 4,644,455 | 2/1987 | Inglis et al. . |
| 4,654,758 | 3/1987 | Szekacs . |
| 4,740,871 | 4/1988 | Dilouya . |
| 4,755,918 | 7/1988 | Pristash et al. . |
| 4,794,493 | 12/1988 | Luciani . |
| 4,803,601 | 2/1989 | Collot et al. . |
| 4,811,172 | 3/1989 | Davenport et al. . |
| 4,868,718 | 9/1989 | Davenport et al. . |
| 4,868,723 | 9/1989 | Kobayashi . |
| 4,883,333 | 11/1989 | Yanez . |
| 4,916,592 | 4/1990 | Sultan et al. . |
| 4,956,759 | 9/1990 | Goldenberg et al. . |
| 5,001,609 | 3/1991 | Gardner et al. . |
| 5,058,985 | 10/1991 | Davenport et al. . |

FOREIGN PATENT DOCUMENTS

| | | |
|---|---|---|
| 0364228 | 4/1990 | European Pat. Off. . |
| 2710553 | 9/1978 | Germany . |
| 2180051 | 3/1987 | United Kingdom . |

*Primary Examiner*—Richard R. Cole
*Attorney, Agent, or Firm*—Damian Porcari; Roger L. May; Kevin G. Mierzwa

[57] ABSTRACT

A illuminator for use on a vehicle utilizing light from a remote light source. A semi-paraboloidal reflector collects and collimates light from the remote light source which is transmitted to the semi-paraboloidal reflector through a light guide, such as a fiber optic light pipe. Light from the reflector is reflected outward through a plurality of reflective facets to form a light beam.

8 Claims, 3 Drawing Sheets

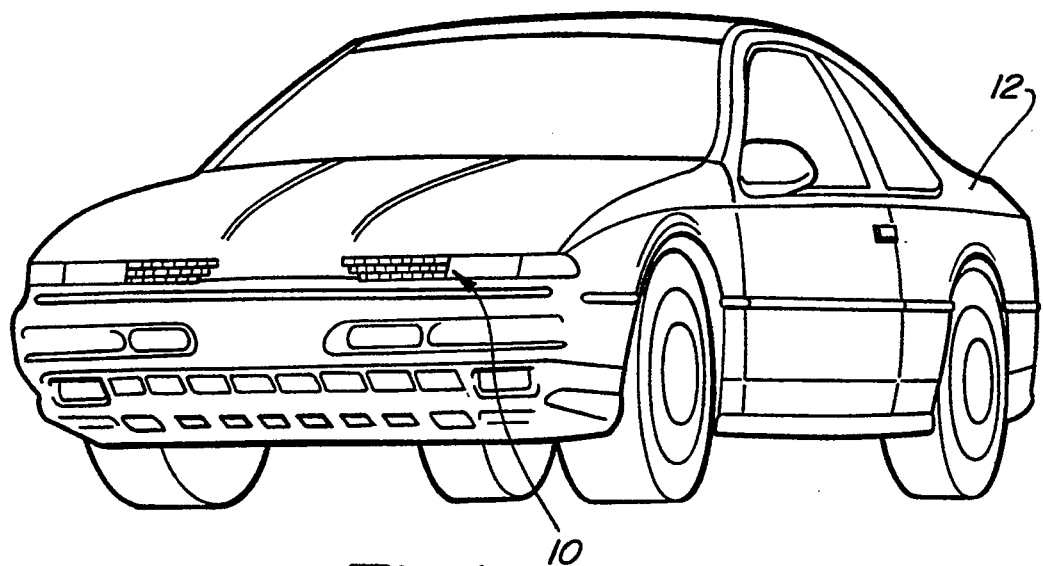
Fig-1
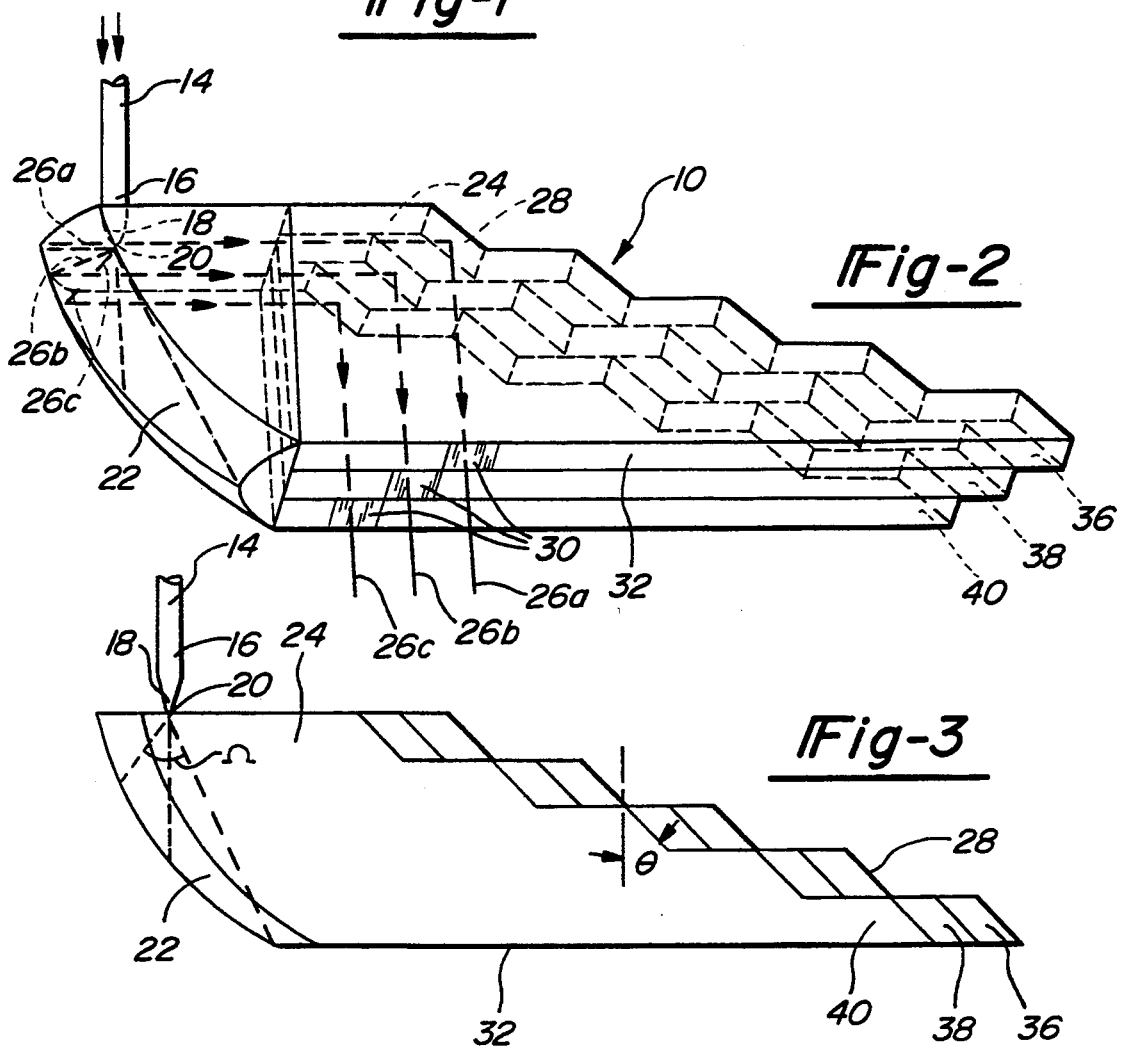
Fig-2
Fig-3

LOW PROFILE ILLUMINATOR

BACKGROUND OF THE INVENTION

1. Field Of the Invention

The present invention relates generally to a light transmission system for use on a vehicle and more specifically to an illuminator for use as a vehicle headlight or taillight.

2. Description Of the Related Art

Conventional light transmission systems used for vehicle headlights or taillights typically utilize a bulb and reflector system. In a bulb and reflector system, a filament of the bulb is placed at or near a focal point of a reflector. The light emitted by the bulb filament is collected by the reflector and reflected outward to form a light beam. A lens is used to shape the light beam into a specified pattern as established by vehicle lighting standards. Typically, a conventional bulb and reflector system collects and reflects only thirty percent of the light emitted from the bulb filament.

Bulb and reflector systems have several disadvantages, including aerodynamic and aesthetic styling; e.g., the depth of the reflector along its focal axis and the dimensions of the reflector in directions perpendicular to the focal axis have greatly limited attempts at streamlining the front end of the vehicle. Additionally, the thermal energy given off by the bulb during operation must be considered as the size of the reflector and the material used in its construction vary depending upon the amount of thermal energy radiating from the bulb filament. Decreasing the size of the reflector requires an increase in the thermal resistivity of the reflector material.

One approach to developing a headlight for use with the newer streamlined body designs is proposed in U.S. Pat. No. 4,432,039 which discloses an elliptical reflector used to concentrate and focus light on a light bar having a plurality of reflective facets. While this approach may be useful, a certain portion of the light from the reflector escapes reflection at the facets, thus lowering the efficiency of the headlight. Additionally, the headlight requires the use of lens optics to focus the light reflected by the facets.

Thus, there is a need in the art for an efficient low profile illuminator which accommodates both thermal considerations and the space limitations dictated by the vehicular aerodynamic and styling requirements.

SUMMARY OF THE INVENTION

Accordingly, the present invention is a unique and efficient low profile illuminator for use as a vehicle headlight or taillight. In general, the low profile illuminator includes a remote light source having a light pipe connected thereto. The light pipe feeds light into the illuminator. The illuminator includes a semi-paraboloidal reflector section and a light emitting section including a plurality of facets. Light collimated by the semi-paraboloidal section is received and reflected outward by each of the facets.

One advantage of the present invention is that low profile and high efficient miniature headlights can be developed, allowing a designer greater latitude with respect to aerodynamic and aesthetic styling. Additionally, the bulb filament and corresponding thermal energy are contained at a remote light source. Only the light is transmitted to the illuminator. Any design requirements based on thermal considerations or concerns may now be eliminated. Further advantages of the present invention include more available lumens, allowing greater design freedom and control of beam pattern intensity and distribution. Finally, the present invention provides an illuminator which is simpler to manufacture, package and assemble.

BRIEF DESCRIPTION OF THE DRAWINGS

FIG. 1 is a perspective view of an illuminator according to the present invention, illustrated as low profile headlight on a vehicle.

FIG. 2 is a perspective view of the illuminator of FIG. 1.

FIG. 3 is a top view of the illuminator of FIG. 1.

DESCRIPTION OF THE PREFERRED EMBODIMENT(S)

Figure 4:
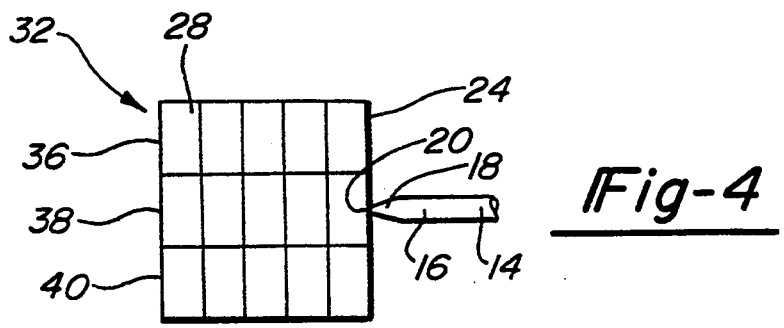
FIG. 4 is a side view of the illuminator of FIG. 1.
Figure 5:
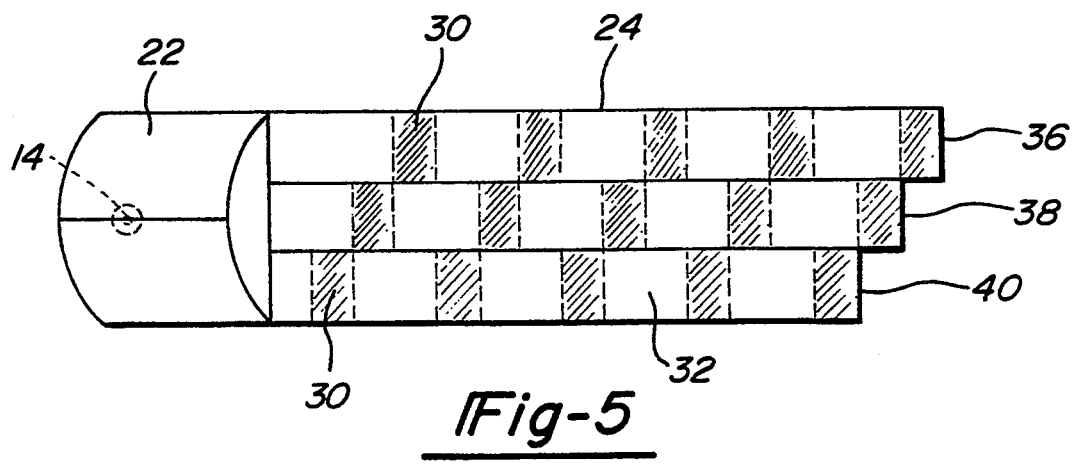
FIG. 5 is a front view of the illuminator of FIG. 1.

Turning now to the drawings and more particularly to FIG. 1, an illuminator 10 is shown in use as a headlight on a vehicle 12.

Referring now to FIGS. 2–5, an illuminator 10, according to the present invention, is shown. The illuminator 10 receives light from a fiber optic light pipe 14 which transmits light from a remote light source (not shown) to a NIO (non-imaging optics) concentrator 16 having a tip 18. Non-imaging optics do not require that the emitting surface be imaged onto the viewing plane and thus provide greater design freedom. The illuminator 10 includes a reflector section 22 having a semi-paraboloidal shape having a focal point 20. The focal point 20 is that point at which light rays emanating from the point are reflected by a mirror as parallel rays of lights or conversely that point at which parallel rays of light meet after being reflected by a mirror. It should be appreciated that the focal point 20 of the reflector section 22 is positioned adjacent tip 18 of the NIO concentrator 16 and collects the light rays 26a, 26b, 26c exiting the NIO concentrator 16. The reflector section 22 then collimates the light rays 26a, 26b, 26c towards an emitter section 24. The emitter section 24 includes an array of reflective facets or surfaces 28 which receive the light rays 26a, 26b, 26c collimated by the reflector section 22. The reflective facets 28 redirect the light rays 26a, 26b, 26c out of the illuminator 10 as a light beam for use in illuminating a roadway. The emitter section 24 is shown made up of three individual planar sections 36,38,40. Each planar section includes a plurality of reflective facets 28 arranged in a stair-step fashion which are offset with respect to the adjacent sections. It should be appreciated that the emitter section 24 can be made as a single section having only one set of facets 28 arranged in a stair-step fashion.

Figure 6:
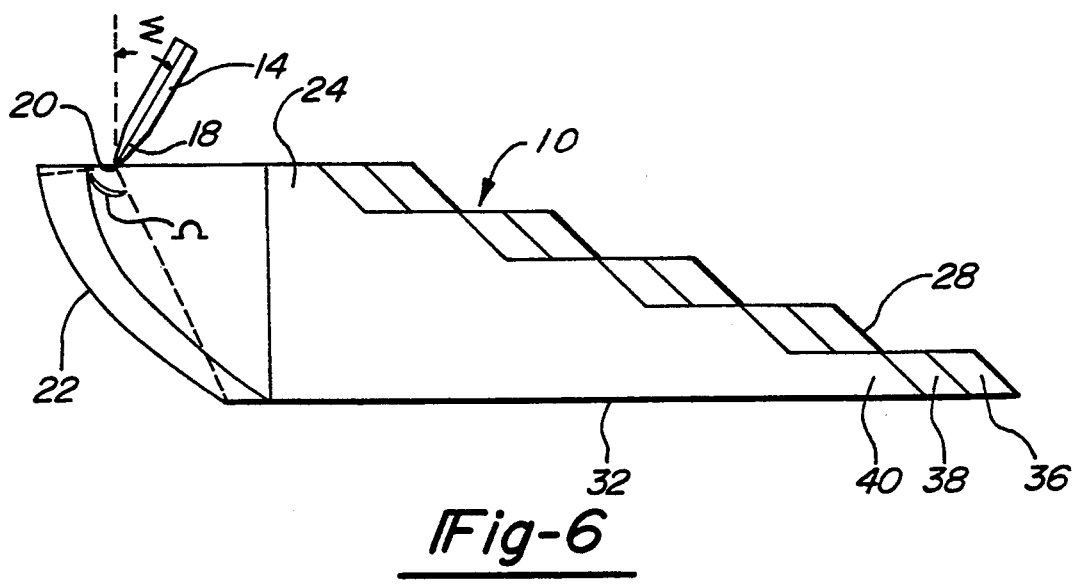
FIG. 6 is a top view of the illuminator of FIG. 1 having an inclined light source.

The purpose of the NIO concentrator 16 is to reduce the size of the light aperture seen by the semi-paraboloidal reflector section 24. It should be appreciated that as the aperture increases in size the glare or angle that the light ray deviates from being parallel with the focal axis, increases thereby decreasing headlight performance. The NIO concentrator 16 works such that the light entering the larger diameter end exits at the smaller diameter end at a smaller aperture and wider cone angle. For a given reflector focal length, the smaller the aperture the smaller the angle of deviation would be. The angle that the light ray deviates from being parallel to the focal axis is given by the equation $$\Delta = \mathrm{Tan}^{-1}(R/2f)$$

where R equals half the aperture width and f equals the focal length. Typically there is a maximum limit on the size of the aperture as seen by the reflector, in the design of an illuminator in order to generate an acceptable beam pattern. While increasing the focal length decreases the size of the aperture, such an increase results in a larger reflector and requires a greater amount of space on the vehicle. As shown in FIG. 6, the collection efficiency of the reflector section 22 with respect to the cone angle $\Omega$ can be improved by inclining the axis of the concentrator at an angle $\Sigma$ with respect to the focal axis. It should be appreciated that the combination of inclining the axis of the NIO concentrator 16 coupled with an appropriate cone angle $\Omega$ enables the entire reflector section 22 to collect and collimate substantially all of the light emitted from the NIO concentrator 16.

Turning once again to FIG. 2, the illuminator 10 is, preferably, made from a transparent, solid piece of plastic such as polycarbonate and utilizes the principle of total internal reflection (TIR) to reflect light at the reflective facets or surfaces 28. Other transparent materials such as acrylics may also be used. For total internal reflection of light rays 26a, 26b, 26a to occur at the facets 28, the incidence angle $\Theta$, i.e. the angle of the facet with respect to the light ray in the instant case $\Theta = 45°$, must be greater than the critical angle $\Theta_c$ given by the equation $$\Theta_c = \sin^{-1}(n_1/n_2)$$

where $n_1$ is the index of refraction of the surrounding medium (in this case air), and $n_2$ is the index of refraction of the manifold medium. If a polycarbonate is used as the material for the manifold, then $n_1 = 1.0$, $n_2 = 1.59$ and $\Theta_c = 39°$. Thus, an incidence angle $\Theta$ of 45° for the facets 22 would exceed the critical angle $\Theta_c$ and provide total internal reflection of the light rays 26a, 26b, 26c. While total internal reflection is the preferred form of reflecting the light ray, the reflective facets 28 could also be coated with a reflective or mirrorized coating to reflect the light rays.

Figure 7:
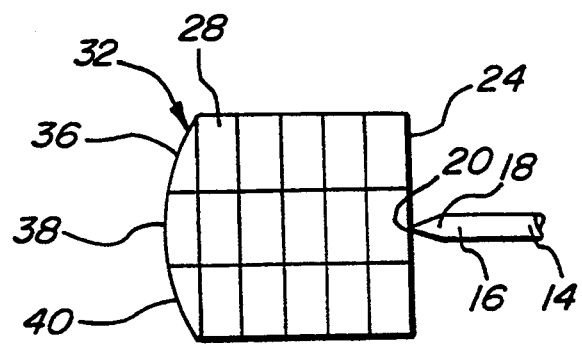
FIG. 7 is a side view of an alternative embodiment of the illuminator of the present invention.
Figure 8:
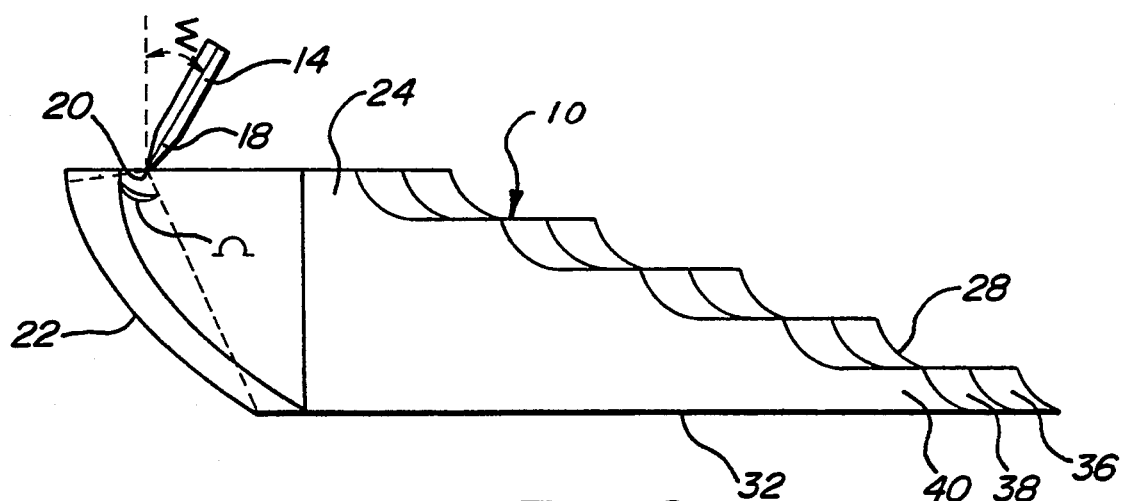
FIG. 8 is a top view of the illuminator of FIG. 1 having curved reflective facets.

Specific beam patterns for the illuminator 10 are developed by combining the light rays reflected from the individual facets 28 as shown by light zones 30. In the preferred embodiment the front face 32 is a flat surface positioned perpendicular to the direction of the light rays 26a, 26b, 26c, to prevent any refraction of the light rays exiting the emitter section 24 of the illuminator 10. However, it should be appreciated that the front face 32 of the emitter section 24 may be formed as a complex or curved surface (See FIG. 7), in order to provide greater design freedom and control of beam pattern intensity and distribution. Lens optics (not shown) such as flute or prismatic lenses are placed ahead of the front face 32 to generate either a low beam or high beam pattern. Alternatively, the facets 28 may have curved or complex surfaces in which case the need for lens optics can be eliminated and a clear lens can be used.

It should be appreciated that substantially all of the light rays 26a, 26b, 26c emitting from the NIO concentrator 16 are captured and collimated by the reflector section 22 whereby all of the collimated light rays are reflected from the facets 28 outward as useable illuminating light. Such a system allows a very low profile and highly efficient illuminator to be developed. It should also be appreciated that by changing the arrangement, position, or surface configuration of the facets a variety of styling profiles and beam patterns may be developed allowing better design and freedom for headlight beam pattern intensities and distribution.

It should also be appreciated that very low profile head lamps of up to 1" in height can be developed by choosing proper dimensions for focal length and NIO concentrator tip diameter. By collimating the light rays before they strike reflective facets a greater amount of light can actually be projected outward in the form of the headlight beam. Thus, the present invention increases the efficiency of the illuminator.

It can be seen that the low profile light provides the designer with a smooth shape which enables the designer to blend the light with the lines of the vehicle and thereby achieving a very aerodynamic and aesthetically appearing design. While the present invention is shown in use as a vehicle headlight, it may also be used in vehicle taillights, operating lights and interior lights.

What is claimed is:

1. A lighting System, including a remote light source comprising:
    an illuminator having a semi-paraboloidal reflector section having a focal axis and a focal point and a plurality of adjacent emitter sections each emitter section having at least one reflective facet;
    a light guide for transmitting light from said remote light source to said illuminator;
    a non-imaging optics concentrator attached to said light guide and positioned at the focal point of said semi-paraboloidal reflector section and inclined with respect to the focal axis of said semi-paraboloidal reflector section; and
    said emitter sections aligned with adjacent emitter sections such that the facets of adjacent emitter sections are staggered whereby the light from each reflective facet is combined to form a beam pattern.

2. A lighting system for use with a remote light source comprising:
    a light guide for transmitting light from said remote light source;
    an illuminator, said illuminator receiving light from said remote light source via said light guide, said illuminator including a reflective surface which receives and collimates the light exiting said light guide and a plurality of planar sections, said planar sections having a front face and a rear face, said rear face including at least one reflective facet positioned oblique said collimated light for receiving and redirecting said light outward through said front face, said planar sections arranged in adjacent layers such that no two facets of adjacent layers are aligned in a direction perpendicular the collimated light.

3. A lighting system as set forth in claim 2 wherein said illuminator is formed of a material having an index of refraction such that the critical angle when the material is disposed in air is less than 45°.

4. A lighting system as set forth in claim 3 wherein said facets comprise planar surfaces positioned at an angle of 45° with respect to said collimated light.

5. A lighting system as set forth in claim 2 wherein said front face of said illuminator is a complex surface.

6. A lighting system as set forth in claim 2 wherein said reflective facets have reflective surfaces, said reflective surfaces being complex surfaces.

7. A lighting system as set forth in claim 2 wherein said reflective surface includes a semi-paraboloidal reflector.

8. A lighting system as set forth in claim 7 wherein said light guide having a non-imaging optic concentrator positioned on one end thereof, said concentrator positioned at the focal point of said semi-paraboloidal section so that substantially all of said light exiting said concentrator is collected and collimated toward said reflective facets.

* * * * *